United States Patent [19]

Smitt

[11] Patent Number: 5,642,207
[45] Date of Patent: Jun. 24, 1997

[54] COLOR SCANNER WITH VARIABLE LINE RESOLUTION

[75] Inventor: Asbjorn Smitt, Alsgarde, Denmark

[73] Assignee: Contex A/S, Allerod, Denmark

[21] Appl. No.: 307,885

[22] Filed: Sep. 16, 1994

[51] Int. Cl.⁶ .............................. H04N 1/04; H04N 1/40; H01L 27/00
[52] U.S. Cl. ........................ 358/474; 358/443; 358/483; 358/455; 250/208.1
[58] Field of Search .................... 358/401, 408, 358/409, 410, 412, 425, 428, 434, 443, 445, 448, 465, 466, 468, 471, 474, 482, 483, 486, 494, 496, 455, 456, 458, 459, 460, 501, 505, 513, 514, 525, 530; 348/294, 311; 250/208.1, 216, 226, 234, 235; 382/298

[56] References Cited

U.S. PATENT DOCUMENTS

| | | | |
|---|---|---|---|
| 3,919,464 | 11/1975 | Kondoh | 358/486 |
| 4,575,769 | 3/1986 | Arnoldi | 358/498 |
| 4,631,598 | 12/1986 | Burkhardt et al. | |
| 4,934,821 | 6/1990 | Morton | |
| 4,972,273 | 11/1990 | Burkhardt et al. | |
| 5,043,827 | 8/1991 | Beikirch | 358/471 |
| 5,053,619 | 10/1991 | Arimoto | 250/235 |
| 5,117,295 | 5/1992 | Smitt | 358/474 |
| 5,218,457 | 6/1993 | Burkhardt et al. | |
| 5,303,064 | 4/1994 | Johnson et al. | |
| 5,321,529 | 6/1994 | Funada | 358/518 |
| 5,377,020 | 12/1994 | Smitt | 358/456 |
| 5,402,234 | 3/1995 | Deck | |
| 5,442,465 | 8/1995 | Compton | 358/483 |
| 5,452,109 | 9/1995 | Compton | |
| 5,502,578 | 3/1996 | Smitt | |

OTHER PUBLICATIONS

Gennettsen et al. Hewlett–Packard Journal, Aug. 1993.

*Primary Examiner*—Edward L. Coles, Sr.
*Assistant Examiner*—Kimberly A. Williams
*Attorney, Agent, or Firm*—Gustavo Siller; Meredith L. Martin

[57] ABSTRACT

An optical scanner with variable line resolution, said scanner collecting information from an original along lines with a predetermined mutual spacing. A calculating unit calculates the location of lines with desired resolution with respect to the scanned lines in response to a desired resolution. A line detector registers optical information along lines on the original and supplies a signal representing the registered, optical information. The information signal is branched along two branches in a branch means. A delay is coupled in one of said branches and is adapted to delay the information signal passing in the branch for a period of time corresponding to a line length in said information signal. An interpolation means receives the information signals from said branches and forms as a desired line an interpolation signal between information signals in response to the location of the desired line with respect to the location of the scanned lines.

29 Claims, 9 Drawing Sheets

ALGORITHM FOR CALCULATION OF BUFNO AND COUNTDOWN

A = PIXELS IN SCANLINE (EG 6 X 5000 = 30000)
B = STEPS BETWEEN CCD LINES (SEE ABOVE)

| STEPS BETWEEN CCD LINES NO. OF BUFFERS | STEPLENGTH IN MICRO-STEPS | BASE DPI |
|---|---|---|
| 12 | 1 | 800 |
| 6 | 2 | 400 |
| 4 | 3 | 266.7 |
| 3 | 4 | 200 |
| 2 | 6 | 133.3 |
| 1 | 12 | 66.7 |

WITH 12 LINES DELAY FROM G TO B,
AND 24 LINES FROM R TO B

WANTED RESOLUTION X EG 600 DPI
SELECT HIGHER BASE DPI Y (HERE 800 DPI)

FIG. 8

| | | | | | |
|---|---|---|---|---|---|
| 200 | $\frac{800}{600} \cdot 16384 = 21845$ | | | | |
| 201 | 21845 | | | | |
| 202 | 21845 | 5461 | 10922 | 16383 | 21844 |
| 203 | 21845−16384=5461 | −10923 | −5462 | −1 | 5460 |
| 204 | NO ⇒ #209 | YES | YES | YES | NO ⇒ #209 |
| 205 | | − | − | − | − |
| 206 | | $\text{INT}\left(\frac{5461}{1024}\right)=5$ | $\text{INT}\left(\frac{10922}{1024}\right)=10$ | $\text{INT}\left(\frac{16383}{1024}\right)=15$ | |
| 207 | | 5 | 10 | 15 | |
| 208 | | 10922 ⇒ #202 | 16383 ⇒ #202 | 21844 ⇒ #202 | |
| 209 | | | | | ⇒ #210 |
| 210 | YES ⇒ #202 | | | | ⇒ #202 |

COLOR SCANNER WITH VARIABLE LINE RESOLUTION

FIELD OF THE INVENTION

The invention concerns an optical scanner with variable line resolution, said scanner collecting information from an original along lines with a predetermined mutual spacing.

BACKGROUND OF THE INVENTION

Optical scanners of the prior art are provided with a line detector, e.g. in the form of a CCD line array in which the information from the original is collected and processed electronically as pixels. A CCD line array may have e.g. a plurality of light sensitive cells corresponding to 5000 pixels. Several CCD line arrays may be combined to form larger units. The optics of the scanner thus decides the real pixel resolution of the scanner. The pixel resolution may be e.g. 800 dpi. Variations in the pixel resolution of the scanner may be obtained by performing digital averaging on the read image information. Alternatively, the video signal from the line array of the scanner may be resampled with the desired clock frequency. However, it is important that these processing steps can take place directly when data are read, since this obviates the necessity of intermediate storing of data before the resolution of the image is varied.

It is often desired to vary the resolution of the scanner, because data are subsequently to be processed on a PC or a corresponding work station, and it is therefore important that the scanner can supply data which can be used directly in the subsequent data processing.

While data along the read lines can be processed by averaging and the like, the feed rate of the original has so far been used for varying the line resolution of the scanner. This means that the scanner feed rate for the original is increased if the resolution is to be reduced. The line resolution of the scanner might be halved simply by throwing away every second line, but this solution is not acceptable if the desired line resolution cannot be obtained by dividing the desired basic resolution. That is if the desired line resolution is different from 800 dpi, 400 dpi, 200 dpi, etc.

In connection with colour scanners three colour signals are usually picked up from the original, and since the line sensors for the individual colours are offset from each other in the image plane of the lens, the individual sensors pick up information from lines which are offset from each other in the object plane of the lens. Since it is simultaneously desired that the detector is to collect information for the individual colours in one and the same line, it is not possible to vary the feed rate of the original to obtain the desired variable line resolution.

To ensure a variable resolution, there is described a resolution in which a line on an original is imaged as three lines on the line detector. This is achieved by using a colour separator with dichroic coatings. This is described e.g. in Hewlett-Packard Journal, August 1993 by K. Douglas Gennetten et al.

OBJECTS OF THE INVENTION

An object of the invention is to provide an optical scanner with variable line resolution, said scanner collecting information from an original along lines having a predetermined mutual spacing.

Another object of the invention is to provide an optical colour scanner with variable line resolution, said scanner collecting information from an original along several lines in several spectral bands, said lines being positioned with a predetermined mutual spacing.

BRIEF DESCRIPTION OF THE DRAWINGS

The invention will be explained more fully below in connection with preferred embodiments and with reference to the drawings, in which FIG. 1 schematically shows the beam paths in a colour scanner according to the invention, FIG. 8 is a scheme showing an arithmetical example for the use of the flow diagram shown in FIG. 7.

DETAILED DESCRIPTION OF THE DRAWINGS AND OF THE PREFERRED EMBODIMENTS

Figure 1:
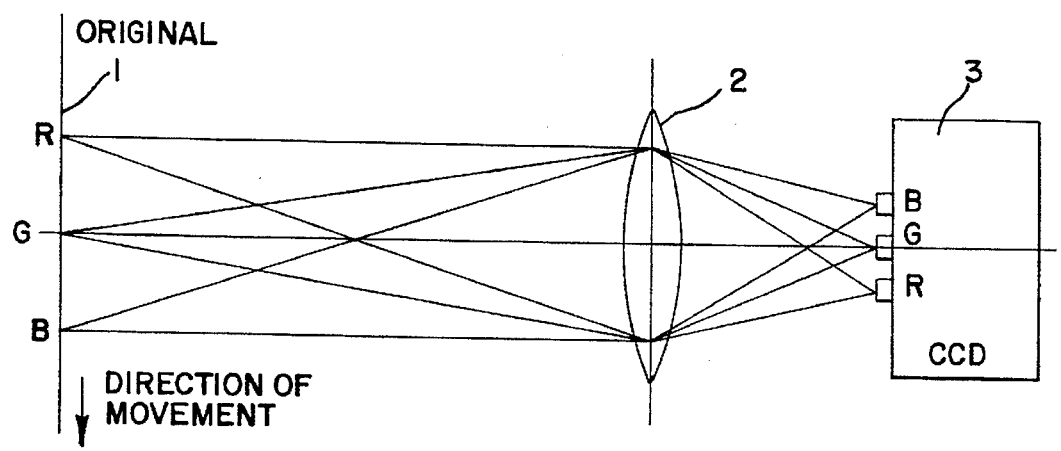

FIG. 1 shows an optical element 2 which is shown as a lens here, but is frequently in the form of a lens bar, a line transversely to an original 1 being imaged as a line on a line detector 3. FIG. 1 shows a system for use in colour scanning, and it will be seen here that the line detector 3 is adapted for colour scanning, since it has three line sensors B, G, R. The line sensors are preferably CCD elements having a colour filter.

Each sensor element may be e.g. 14 pm×14 pm. The line detector may have three lines × 5000 sensor elements. The original is imaged via the optical element 2 on the line detector 3, and since it is clear that each of the sensor lines B, G, R are positioned at a certain distance from each other, e.g. 168 pm, the lines registered by the individual colour sensors B, G, R on the original in the object plane of the optical element will likewise be offset from each other. With a resolution of 800 dpi, a pixel (0.00125 inch×0.00125 inch) in the original plane will be imaged in a pixel in the sensor plane (14 pm×14 pm), corresponding to the scanning of 12 lines with a spacing of 14 pm in the sensor plane with the white sensor R before the corresponding line is scanned with the green sensor G and correspondingly with a line spacing of 0.00125 inch in the plane of the original. Another 12 lines will have to be scanned before the same line reaches the blue sensor B. The original is passed through the optical element in the direction indicated by the arrow. It is thus clear that the signal from the red sensor has to be delayed with respect to the signal from the green sensor, which must in turn be delayed with respect to the signal from the blue sensor. This will be explained more fully below.

Figure 2:
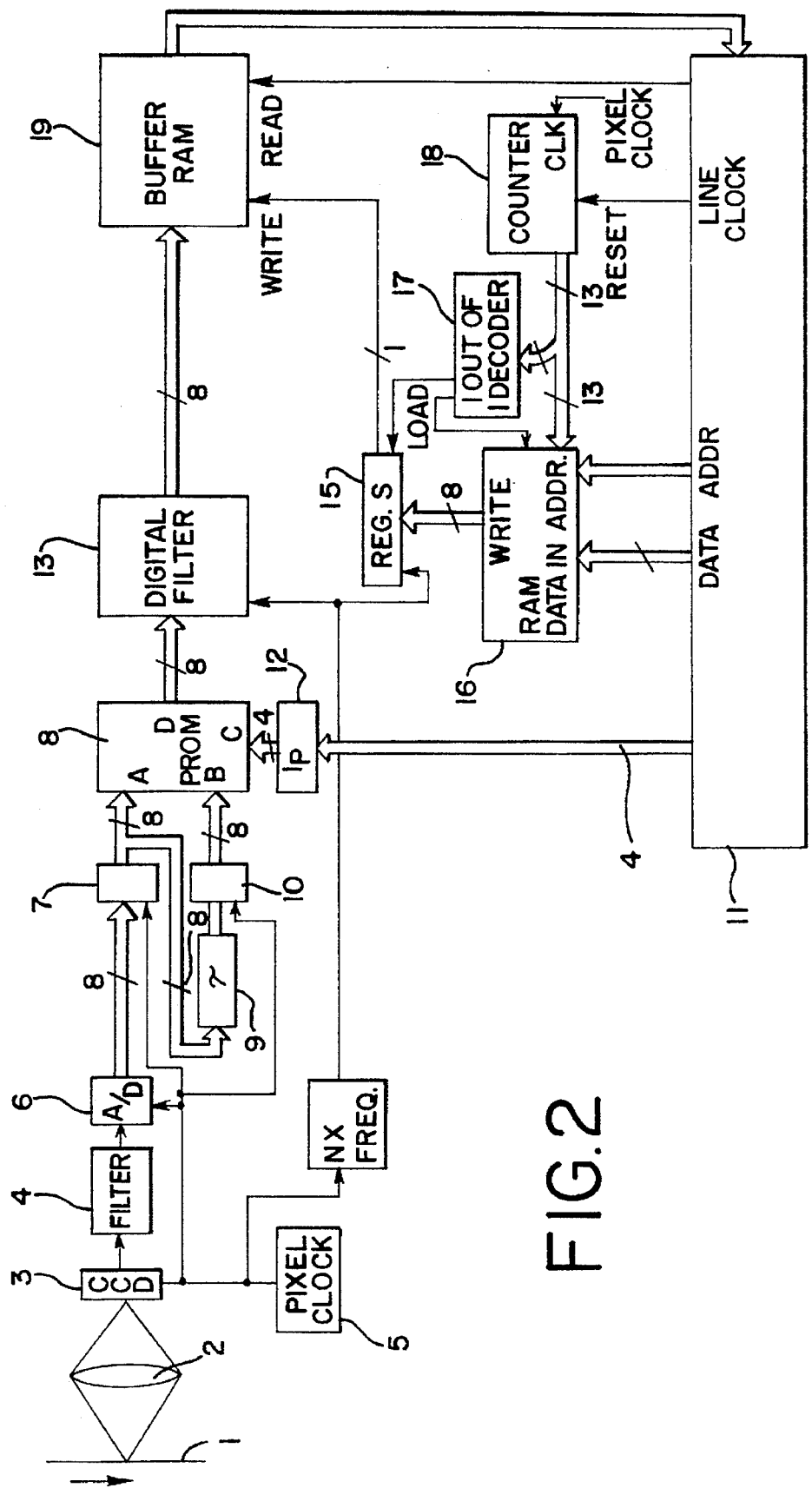
FIG. 2 shows how variable line and pixel resolution is obtained in a scanner according to the invention.

The principle of the invention is also shown in FIG. 2, the original 1 being moved past the optical element 2 which images a line of the original on the line detector 3. The invention will be explained in connection with a black and white scanner in connection with FIG. 2. A video signal is transferred from the line detector 3 to a filter 4, which takes place under the control of a pixel clock generator 5. The filtered signal is transferred from the filter 4 to an analog-to-digital converter 6 in which the video signal is digitized. It is clear of course that the video signal may advantageously be weighted with respect to a threshold value and optionally be adjusted with a view to compensating for a disuniform sensitivity to the CCD elements. This is described in the applicant's own U.S. applications Ser. No. 07/835,774 (entitled: Thresholding With Prescan) and Ser. No. 07/890, 576 (entitled: Thresholding Without Prescan), and these documents are hereby incorporated herein by reference.

The digital signal is transferred from the analog-to-digital converter 6 via an 8-bit bus to a hold circuit 7 in which the digital value is written under control of the pixel clock signal. The digital signal is transferred from a hold circuit 7 to an A input on a PROM circuit 8. The bus between the hold circuit 7 and the PROM circuit 8 is formed with a branch such that a copy of the digital signal is applied to a delay circuit 9. The delay circuit 9 introduces a delay corresponding to the time it takes to transfer a line to the PROM circuit 8. In Case of a conventional CCD element with 5000 pixels in a line, the delay circuit 9 is e.g. a buffer having 5000 register locations, and the delay elements is clocked out with the pixel clock signal. The contents of the delay circuit 9 are transferred to another hold circuit 10, which is likewise clocked out with the pixel clock signal. The contents of the hold element 10 are then transferred to a B input on the PROM circuit 8. Thus, the PROM circuit 8 receives the same pixel from two successively scanned lines on its two inputs.

A microcontroller 11 has received information on the desired line resolution prior to the beginning of the scanning, and on the basis of its knowledge of the actually scanned line resolution the microcontroller 11 calculates for each line an interpolation factor $I_p$ which is transferred via a register 12 to a C input on the PROM circuit. This interpolation factor $I_p$ thus weights the interpolation calculations in the PROM circuit 8. The interpolation factor is calculated for each line and with knowledge of the interpolation factor of the last line.

It will be seen that the interpolation factor $I_p$ is transferred via a 4-bit bus, it having been found in practice that 16 possible interpolation points between two lines are often sufficient for use in the variation of the resolving power. The PROM circuit thus calculates an interpolated line, the interpolation values being supplied on the output D. The interpolation line may be e.g. calculated according to the following algorithm:

$$D=(B(16-C)+AC)/16.$$

wherein D is a pixel in the desired line; A is an associated pixel in a last-scanned line; B is an associated pixel in a next-to-the-last scanned line; and C represents a distance between the desired line and a new scanned line.

A new interpolation value is calculated by adding a distance between the scanned lines to a previously calculated interpolation value. If the new interpolation value is greater than the distance between the scanned lines, the distance is subtracted from the new interpolation value.

Figure 9:
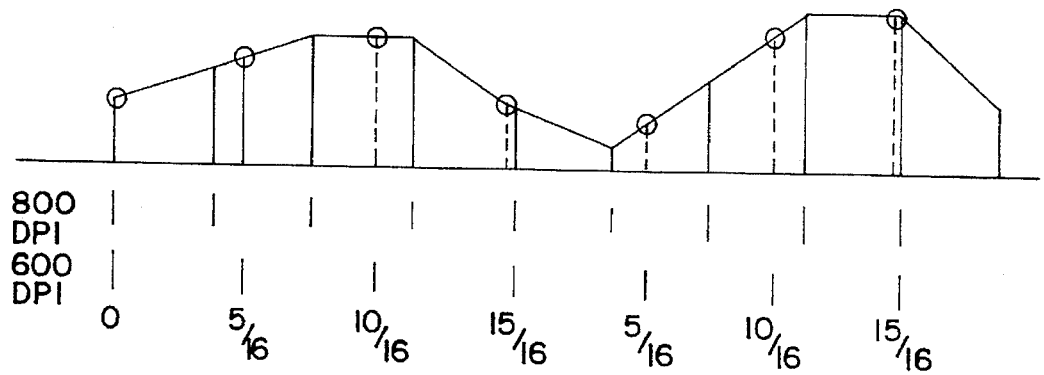
FIG. 9 is a graph illustrating how the values of the desired lines are determined with respect to the scanned lines.

The principle is illustrated in FIG. 9. It will be seen that the amplitude values of the individual pixels transversely to the lines are determined by scanning and shown with vertical posts, the interpolation procedure providing the connection curve through the maxima of the posts. The actual interpolation introduces new values at another resolution, and these are marked by circles around the termination of dash-and-dot lines.

The data signal is transferred from the output D on the PROM circuit 8 to a digital filter 13 in which the signal is interpolated, and the number of sample points are increased to N + pixel clock, N being selected to be 2 below. It is important that the number of sample points supplied on the output of the filter provides a horizontal resolution which is greater than or equal to the desired one. This is described in detail in the applicant's own U.S. Pat. No. 5,502,578 (entitled: An Optical Scanner Having Variable Resolution), which is incorporated herein by reference.

A pixel clock signal is passed to a counter 18 which counts this pixel clock, and the output signal from the counter 18 is applied to a RAM store 16 via a 13-bit data bus. The two least significant bits are passed to a one-out-of-four decoder 17 which loads the contents of the register 15. The microcontroller 11 is determined prior to the sample points of the scanning, corresponding to the desired resolution, and these sample points are stored in multibit form in the RAM store 16. The digital signal from the counter 18 is employed for addressing and writing the local sample points, which are then transferred to the register 15 and are used in the digital filter 13 as sample points, which are then transferred to the register 15 and exchanged with the N × pixel clock, here shown with N=2, and an exchanged bit=1, and are used in the RAM store 19 as a write pulse for controlling writing in the RAM store of the data signal on the output of the digital filter 13. The contents of the RAM store are written via a write connection from the microcontroller to the latter via a data bus. This is described in detail in the applicant's own U.S. patent application Ser. No. 08/213,990. A line clock signal from the micro controller 11 is used for resetting the counter 18 upon new line.

As outlined in connection with FIG. 2, it is thus possible to change the resolution of a scanner in a horizontal as well as a vertical direction, even though the original is moved past the line detector 3 in constant steps corresponding to e.g. 800 scan lines per inch.

Figure 3:
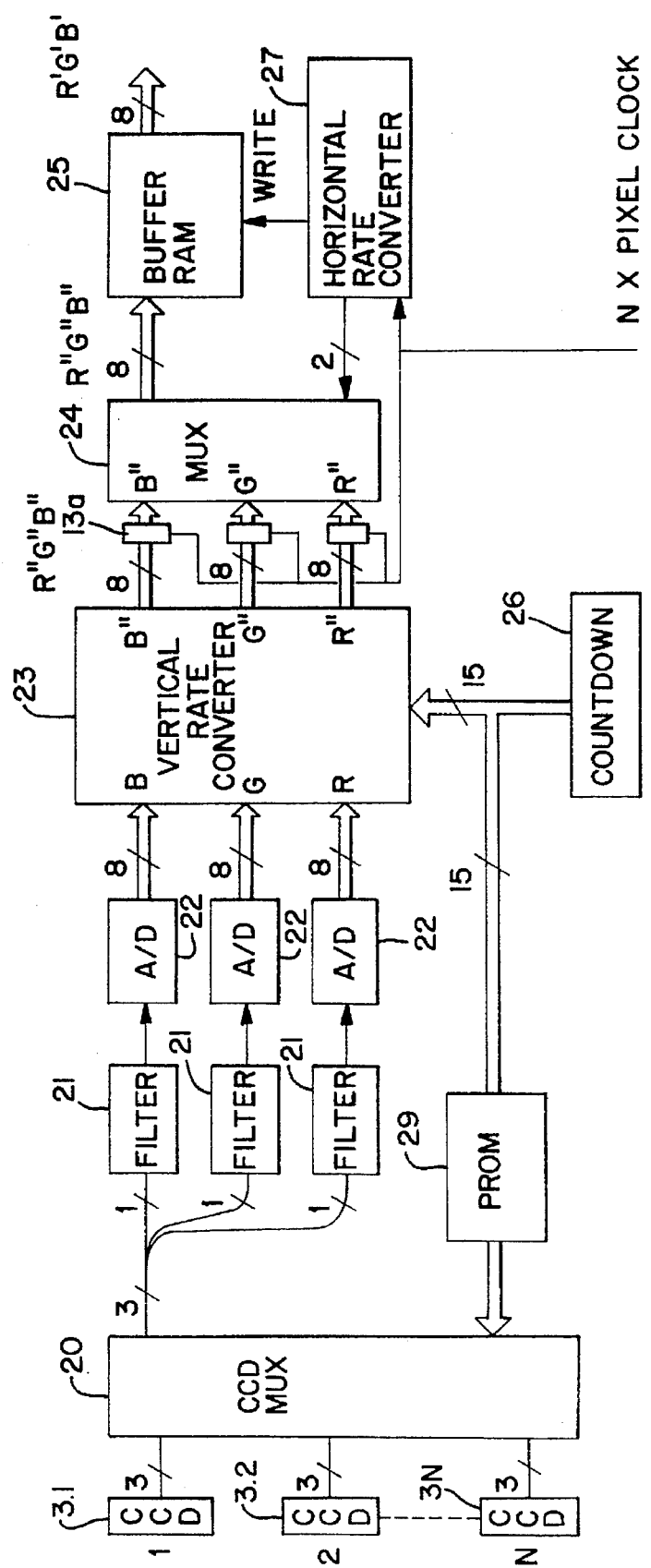
FIG. 3 shows by way of a diagram the principle of varying the line resolution of a scanner according to the invention.

FIG. 3 shows the structure of a colour scanner in which N line detectors 3.1–3.N are arranged in extension of each other, and each picks up data from a line segment on the original. These line segment data are multiplexed by means of a CCD multiplexer 20, which may be done e.g. in the manner disclosed in U.S. Pat. No. 5,117,295.

It will be seen that the line detectors 3.1–3.N are connected to the CCD multiplexer 20 through respective 3-wire connections, the colour information signals from each of the colour sensors B, G, R of the line detectors being transferred via separate lines. There are also three separate connections from the CCD multiplexer 20, and the actual line conversion for the individual colour information signals takes place in respective line conversion units in a vertical rate converter 23 shown in FIG. 3. Before the individual colour information signals are supplied to the vertical rate converter 23, the signals are filtered in filters 21, and the analog signal emitted from the filters 21 is digitized in analog-to-digital converters 22, which supply a digital 8-bit signal on the output which is transferred via respective busses to the vertical rate converter 23. The line resolution is changed in the vertical rate converter 23 so that the converter 23 supplies three digital signals B", G", R" on the output, corresponding to the signals B, G, R received on the input, the resolution having been changed to the desired resolution. The vertically interpolated colour information signals B", G", R" are transferred from the output of the converter 23 via respective 8-bit data busses to digital filters 13a and are digitally-filtered for interpolation in a horizontal direction, and further on to a multiplexer 24 in which the signals are time-multiplexed and are transferred via another 8-bit data bus to a buffer 25 in the form of a RAM store. A count down counter 26 is loaded at each line start with the number of pixels in a line, and this value is received from a microcontroller (not shown). The actual value of the count-down is transferred via a 15-bit data bus to a PROM store 29 in which the value is used for selecting an address, the address concerned being used for controlling the multiplexing of the individual CCD line sensors 3.1–3.N of the line detector 3. Writing takes place successively from the individual line arrays 3.1–3.N. The signal from the count down 26 is likewise transferred via a 15-bit bus to the converter 23 in which the signal is used as addressing of pixel data within a scan line.

Figure 4:
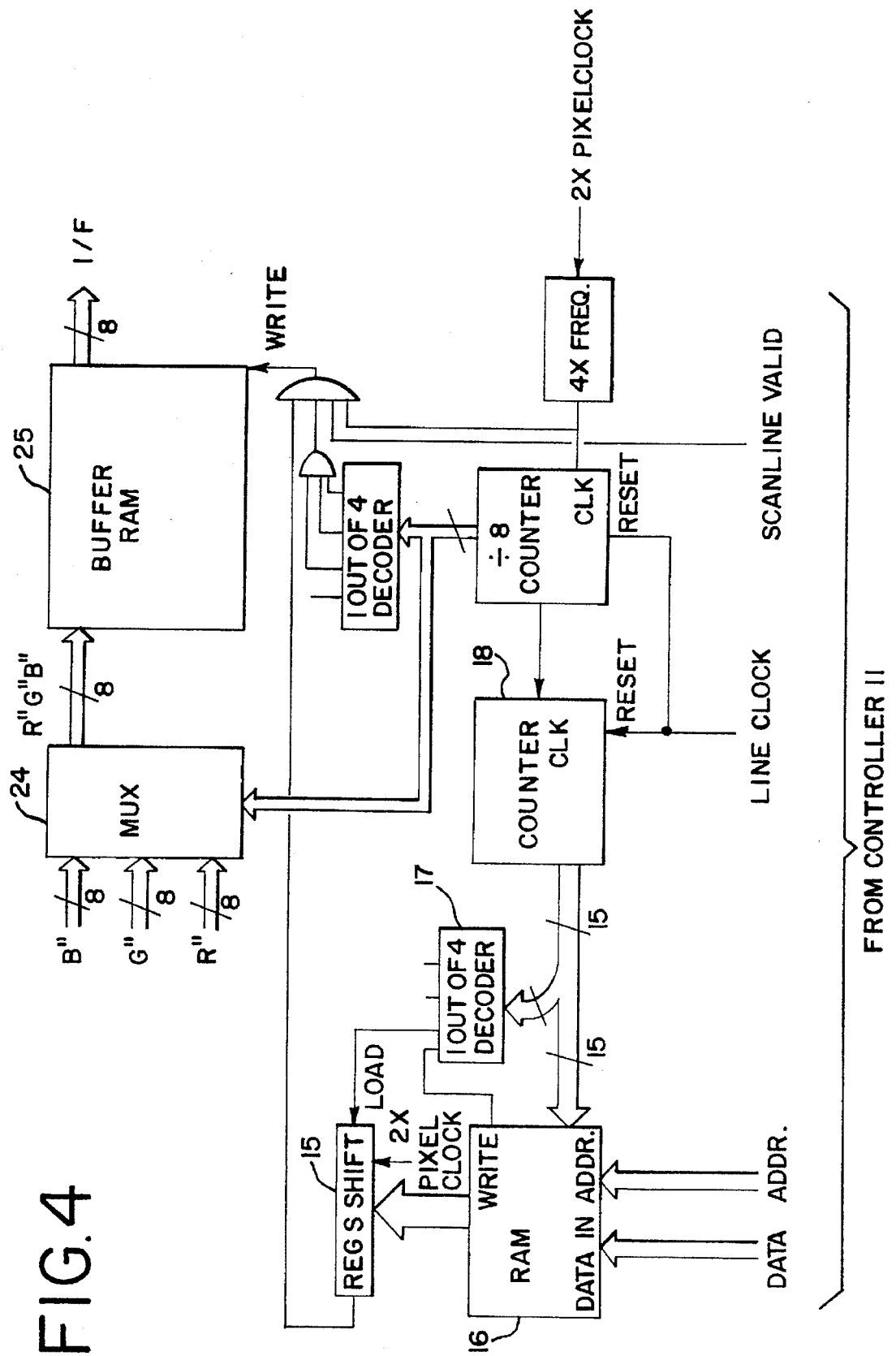
FIG. 4 shows an embodiment of a colour scanner for varying the pixel resolution of a scanner according to the invention, FIG. 5 schematically shows the interpolation circuits of a colour scanner according to the invention, FIG. 6 comprised of subfigures 6A–6C is a flow diagram showing how BUFNO and count down are provided.

The horizontal rate converter 27 is shown in detail in FIG. 4, in which the N × pixel clock signal, here shown for N=2, is frequency-multiplied by 4 and is used as a clock for a ÷8 counter, the output being used as a clock for the counter 18, i.e. corresponding to the pixel clock. The counter 18, the RAM 16, the decoder 17 and the shift register 15 operate as described before. The two least significant bits from the ÷8 counter are used for changing the output from the multiplexer between the signals B", G", R". Further, the two least significant bits are also used via the one-out-of-four decoder and the OR gate for providing an input to the AND gate, indicating when the R", G", B" signals on the output of the multiplexer are present. The output from the shift register 15 to the AND gate now indicates that a triplet group of R", G", B" data is to be sampled. The frequency-multiplied clock signal (8×pixel clock) is applied to the AND gate for giving three write pulses to the buffer RAM store 25 for each triplet which is to be sampled to the RAM. Finally, the AND gate receives the scan line valid signal to ensure that only valid scan lines from the vertical rate converter are included.

The time-multiplexed colour information is transferred from the RAM store 25 to an interface unit I/F (not shown) via an 8-bit databus.

Figure 5:
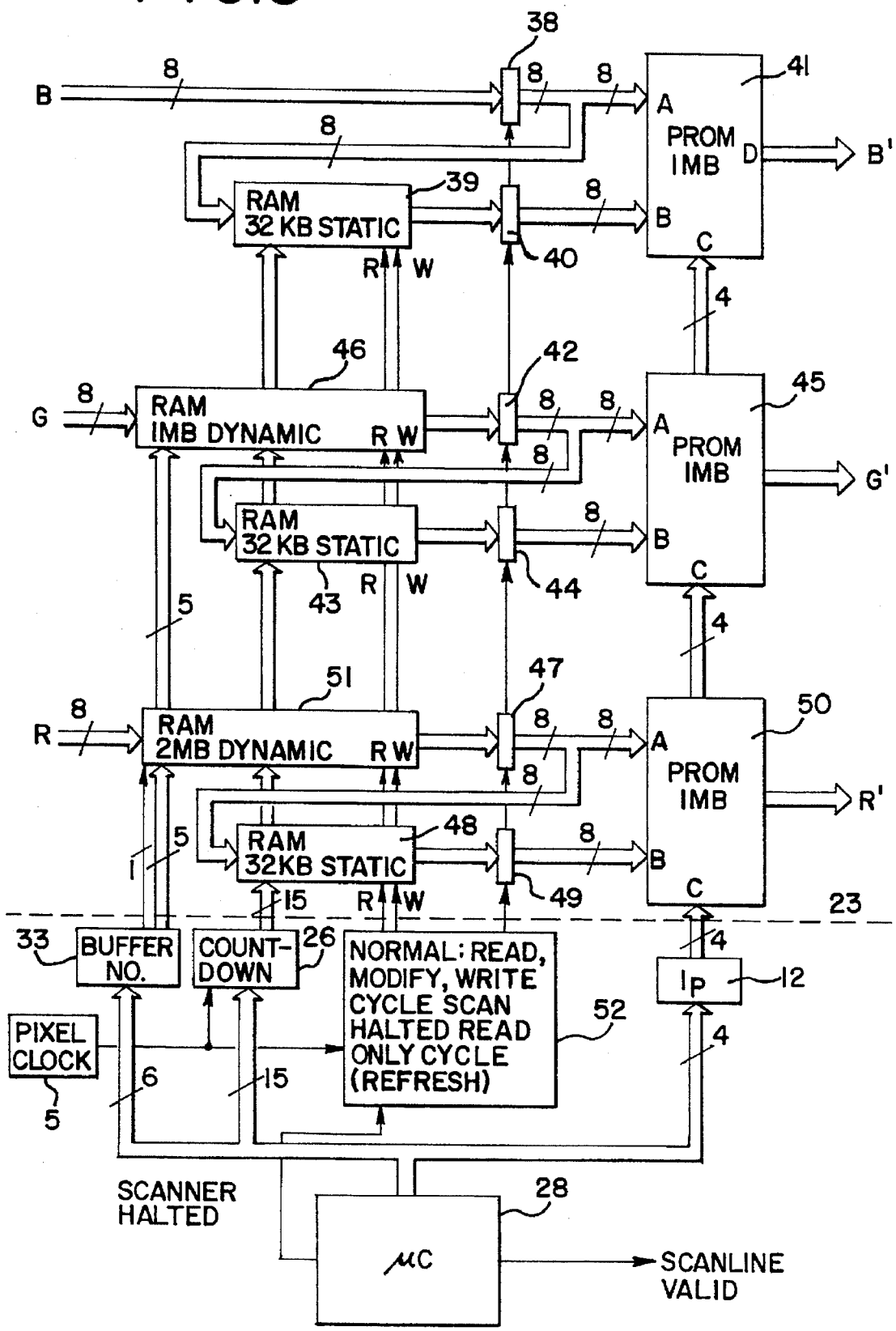

The vertical rate converter 23 shown in FIG. 3 is shown in detail in FIG. 5, from which it will be seen that colour line information for each of the colour detectors of the line detector is supplied on the input side via three 8-bit busses. The digital colour information signal B is passed to a hold circuit 38 which applies the same signal on the output as received on the input in response to a clock signal, and the output is connected to an 8-bit data bus which is branched so that the signal is passed to an input A on a PROM circuit 41 as well as to a buffer 39, and this buffer may be e.g. a static RAM store having a storage capacity of 32 Kbytes. With this storage capacity it is possible to use the buffer 39 for lines composed of up to 6 CCD line arrays each having 5000 pixels. While a pixel value is written from the RAM store 39, the store cell concerned is overwritten with the new pixel value for a following line. Data are written from the RAM store 39 and are transferred via an 8-bit databus to a hold circuit 40 which is clocked out with the same clock as the hold circuit 38. Thus, two associated pixel values for two consecutive lines are transferred to the A gate and the B gate on the PROM circuit 41. The PROM circuit 41 simultaneously receives a 4-bit interpolation value from the microcontroller 28, which takes place via a hold circuit 12 whose contents are transferred to the C gate of the PROM circuit 41, while said circuit receives the pixel values on the A and B gates.

The PROM circuit 41 supplies an output signal B', and this output signal is calculated by means of an algorithm stored in the PROM circuit 41. This algorithm may be expressed as follows:

$$B'=(B(16-C)+AC)/16$$

wherein A and B are the actual pixel values of the last—read scan line and the-next-to-the-last-read scan line, while C is an interpolation factor which is calculated in relation to the location of the desired scan line with respect to the red scan lines as determined by the micro-processor. The interpolation factor C is a 4-bit value and is thus a rounding of the actual interpolation factor, but it has been found in practice that it is fully sufficient to use a 4-bit value in the calculations here. The PROM circuit 41 thus supplies an output signal B' via the output gate D.

Similar signal processing takes place for each of the other colour information signals G and R, and the circuit elements 38–41 in the form of the hold circuits 38, 40, the RAM store 39 and the PROM circuit 41 have corresponding, preferably identical counterparts 42–45 and 47–50 in the converter 23. Since the colour information signals for the colours blue, green and red collected simultaneously with the line detector 3 are offset on the original for scanning, buffer stores 46 and 51 are coupled in the converter, ensuring that the output signals B', G' and R' from the converter are formed by colour information signals collected from the same line on the original 1. For this purpose the buffer 46 is preferably selected as a dynamic RAM store having a storage capacity of 1 megabyte. This is expedient since dynamic RAM stores are relatively inexpensive, and the need of the dynamic RAM stores for current refreshing is ensured in normal operation in a read, modify and write cycle. If scanning is halted temporarily, it is ensured that the contents are not changed in that the dynamic RAMs run through a read-only cycle in which data are just refreshed so that scanning can be resumed from the scan line where feeding of the original was halted. This ensures that the data flow from the scanner can be regulated by start-halt of the scanning, and data overflow can be avoided. Similarly, the buffer store 51 is provided with a dynamic RAM store which has twice the capacity of the buffer store 46.

The microcontroller 28 thus applies a coefficient of interpolation to the hold circuit 12, a figure for the amount of pixels in a scanned line for the count-down counter 26, said figure serving as an address in the delay buffers 39, 43 and 48, as well as a value for the register 33, said figure marking the buffer number or the line number in the buffer store 46 and 51 and serving as an address in the dynamic RAM stores which constitute the buffer 46 and 51. A scanner-halted signal may be applied by the microcontroller 28 to the control unit 52, which controls writing and reading for the buffer registers in the converter 23. As long as interpolation lines are to be calculated, reading and writing are currently performed in the RAM stores and buffer registers, while only reading is performed when a scanner-halted signal is received, so that the contents are not changed in the RAM stores 46 and 51.

The microcontroller moreover supplies a scan line valid signal which decides whether the interpolated data from PROM 41, 45 and 50 are to be used, since it may occur in down sampling that an intermediate scan line is not to be interpolated between two scan lines on the original.

Figures 6A, 6B:
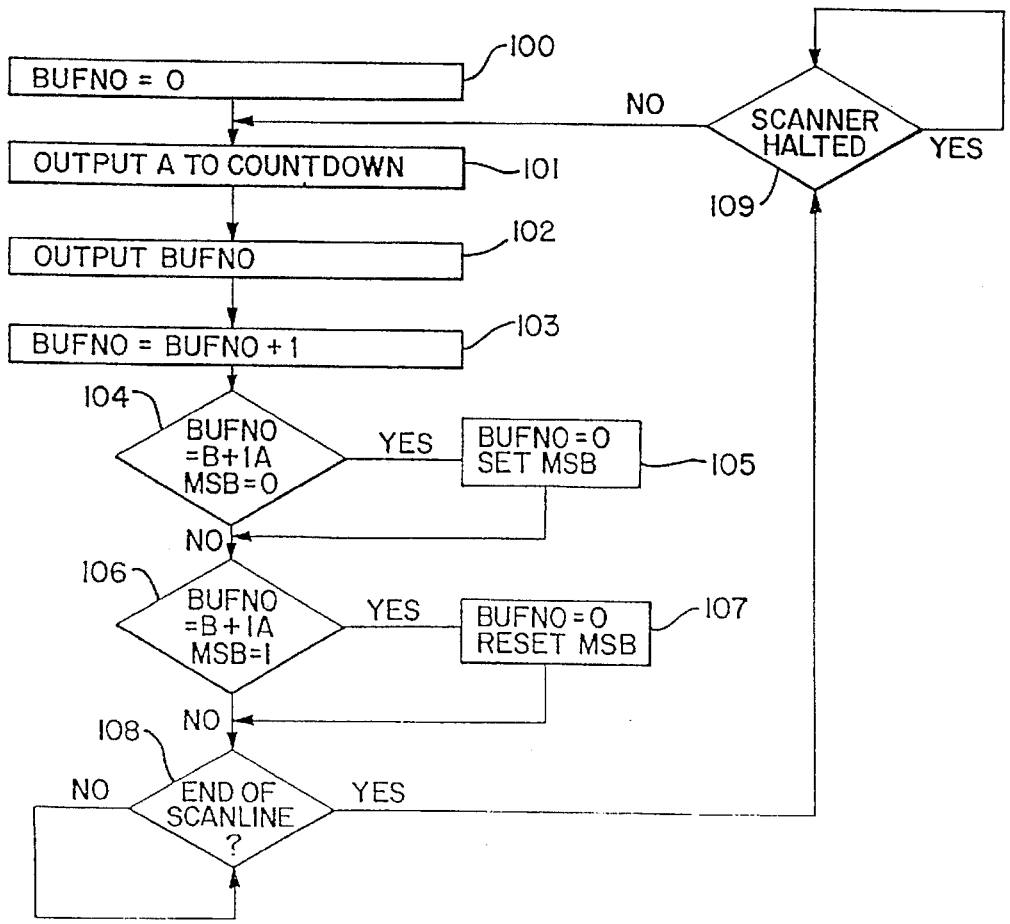
Figure 6C:
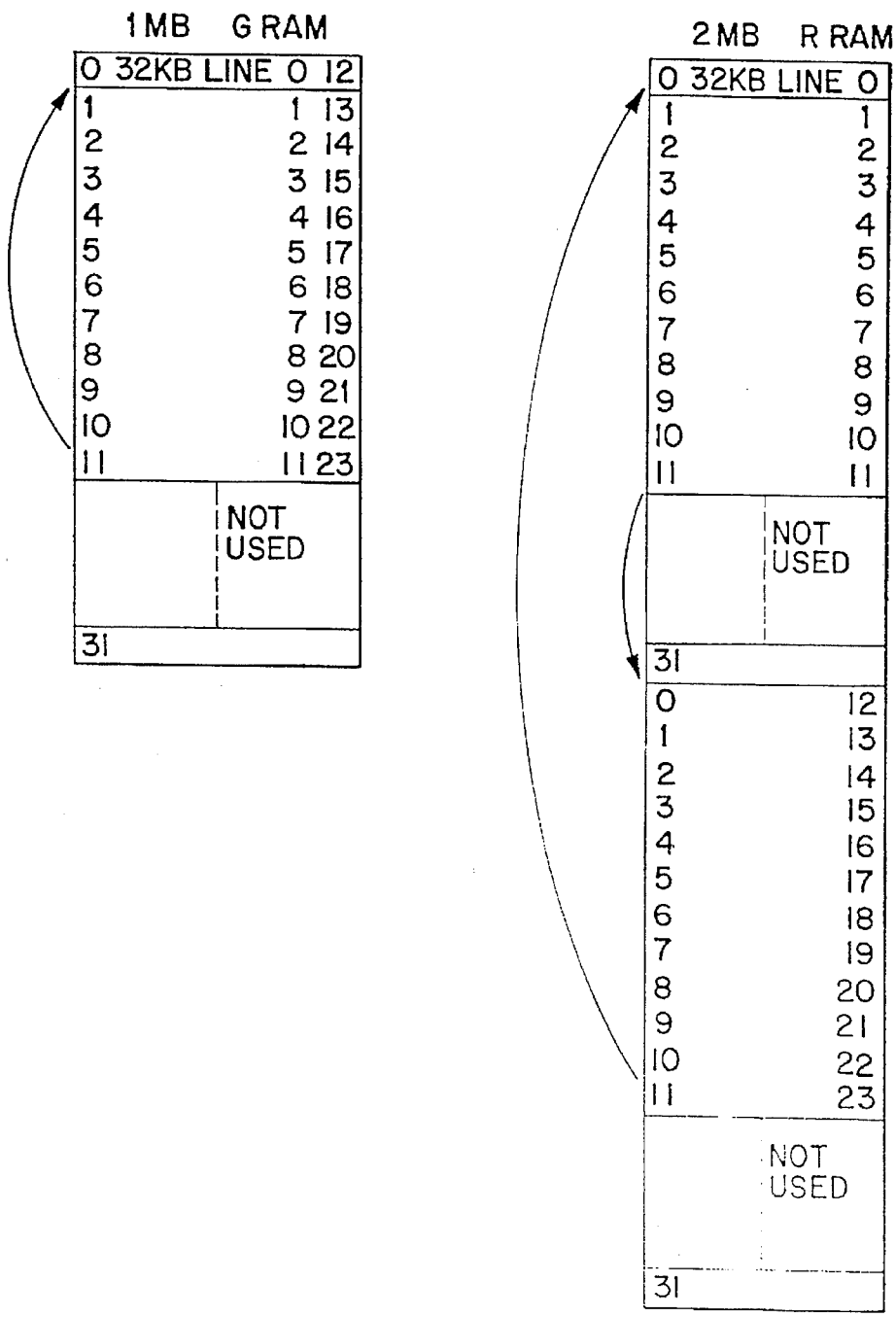

FIG. 6 shows an algorithm for the calculation and transfer of BUFNO and count down values from the microcontroller 28 to the counter 26 and the register 33. The basis of table 1 is a preferred embodiment of the invention in which the scanner may be born with a basic resolution of 800 dpi. Of course, other basic resolutions may be implemented if needed, and a resolution of e.g. 1600 dpi can also be obtained on the basis of a basic solution of 800 dpi by averaging between the values in the line signals, e.g. by feeding the original at half the rate. The number of pixels in a scan line is determined initially, and this may be e.g. 30,000 pixels, since a scan line may be composed of six CCD line detectors, each having 5000 pixels. If it is desired to use the basic resolution of 800 dpi, the red line sensor will pick up 12 scan lines before the green line sensor reaches the same scan line. Another 12 scan lines will be scanned before the blue line sensor reaches the same scan line. There will thus be 12 steps between the CCD lines, which corresponds to the number of buffer units in the buffers 46 and 51. If it is desired to use a basic resolution of 400 dpi instead, every second scan line is thrown away, and only six scan lines will be read with the red line sensor before the corresponding line read with the green line sensor is scanned. The first column in table 1 thus indicates the number of lines read with the red line sensor before the green line sensor picks up the same line, and this is related to the basic resolution stated in the third column. The second column states the length in microsteps.

In the flow diagram, BUFNO is initially reset in step 100, and in step 101 the number of pixels in a scan line is transferred to the count-down counter 26. BUFNO is transferred in step 102 to the register 33, and BUFNO is counted one up in step 103. In step 104 the microcontroller 28 checks whether BUFNO is equal to the number of steps between the CCD lines plus one, while MSB is equal to zero. If this is the case, BUFNO is reset, which corresponds to resetting the 5-bit signal from the register 33, while the most significant bit is set to one. This takes place in step 105. In step 106 it is checked whether BUFNO is equal to B plus one while MSB is equal to one, and if this is the case, BUFNO is reset in step 107, which takes place simultaneously with resetting of the most significant bit.

It is checked in step 108 whether the scan line is finished, and if this is the case, the program jumps to a step 109 in which it is checked whether a scanner-halted signal has been received. If this is not the case, the program jumps back to step 101, and the procedure is repeated.

Figure 7:
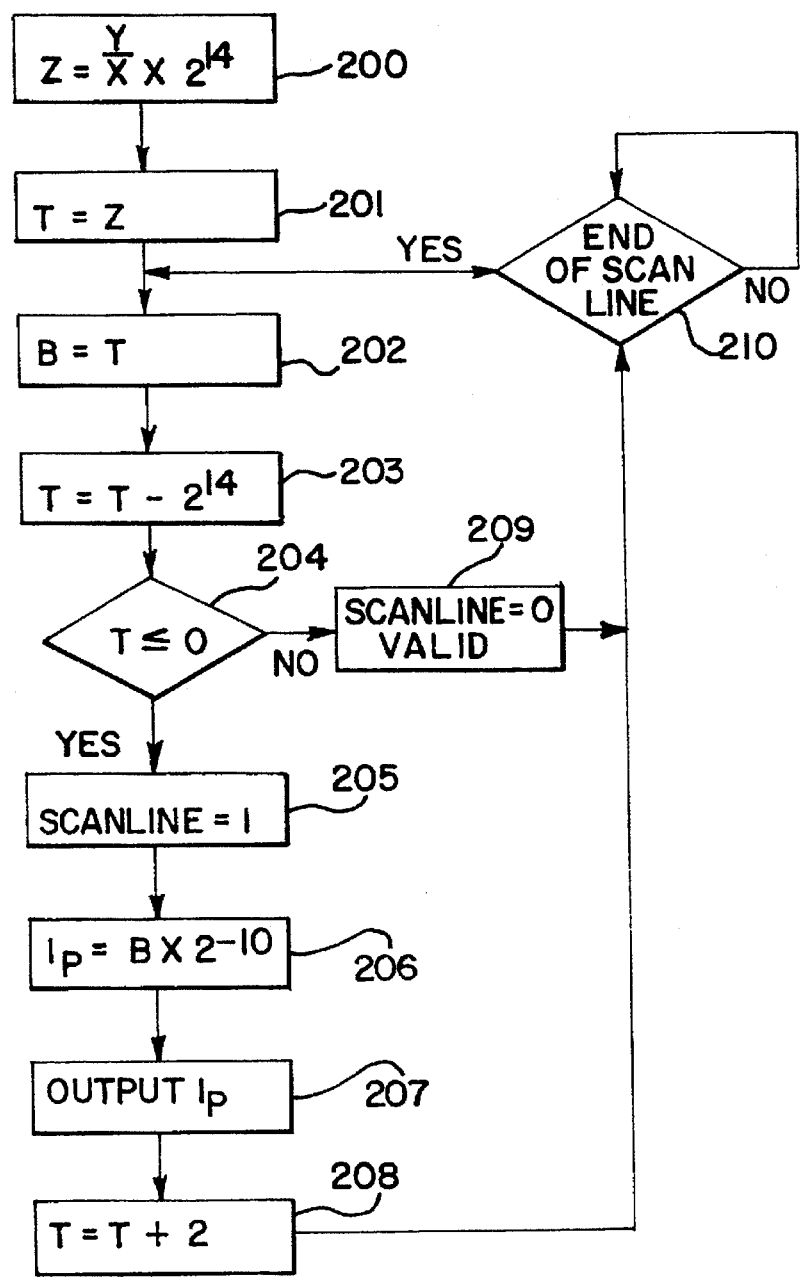
FIG. 7 is a flow diagram illustrating how the interpolation values are determined.

FIG. 7 shows how the microcomputer 28 calculates the interpolation factors, knowing a desired resolution, the basic resolution and the last interpolation factor. The desired resolution is called X, and has been chosen to be 600 dpi in this case. Then the first, higher basic resolution is selected, and Y is 800 dpi in this case. Y is selected from the basic resolutions shown in the third column in table 1 in connection with FIG. 6. A value Z is calculated in step 200, and the actual value is stated in FIG. 8. FIG. 8 is actually a table in which the first column refers to the calculation steps which are shown in FIG. 7. The calculations follow the pattern that each time a value of a variable is determined, this value is stated opposite the step number indicated in the first column. This means that each of the subsequent columns represents a run of the loop in FIG. 7 beginning from step 202.

Thus, in step 200 a value Z is determined in response to a basic resolution divided by a desired resolution multiplied by a constant whose numerical value in the subsequent calculations corresponds to the distance between two scanned lines at the basic resolution. The selection of the constant is arbitrary, but has to be sufficiently great for the numerical error in the algorithm to be small, the value 224 being selected here. This value is transferred to another variable T in step 201. In step 202 a variable B is made equal to T. In step 203 the constant is subtracted from the variable T. If T is greater than zero, the scan line valid is made equal to zero, so that no scan line is to be interpolated between these two scanned lines, which is done in step 209. Then the program jumps to step 210, and again to step 201 when the scan line is finished. In step 202 the variable P is thus set to the new value of T.

If, however, T were smaller than zero in step 204, the scan line is made equal to one, which is done in step 205. Then the interpolation factor $I_p$ is determined in step 206, which is done by dividing B by $2^{10}$, and it is just the four most significant bits of B which are used as the interpolation factor. The interpolation factor is transferred to the register 12 in step 207. A new value of T is determined in step 208, the old value of T being added to the originally determined value of Z. Then the program jumps back to step 210, and a new run of the loop begins when the scan line is finished.

It is shown in FIG. 9 how the interpolation points are positioned, and the basis is the example shown in FIGS. 7 and 8 in which the basic resolution is 800 dpi, while the desired resolution is 600 dpi. It will be seen that the first scan line coincides for 600 dpi and 800 dpi, while the next desired scan line is positioned between the second and the third scanned lines. The distance from the second scan line is 5/16 times the scan line distance, and this will be understood by introducing the value of $I_p$, calculated in step 207, into this algorithm which the PROM circuits 32, 41, 45, 50 employ for determining the interpolation line signal. It will likewise be seen that no interpolation is to be made between the scanned lines five and six, so that the scan line valid signal is zero here.

It is a very simple example which is shown, but with this principle it will be possible to obtain any resolution starting from a basic resolution. It is expedient, but not a necessity to use the basic resolution which is immediately greater than the desired resolution. It will likewise be appreciated that the variation in the line resolution can expediently be performed together with a variation in the pixel resolution along the lines.

The microcontroller 28 may expediently also be designed such that with a prescan of a calibration original with vertical and horizontal lines having a known distance it registers variations in the drive feed rate for the original, so that these variations can be compensated in connection with the conversion of the line resolution. Correspondingly, the converter 27 may be controlled by the microcontroller 28 so as to compensate for imaging errors in resampling.

It is likewise possible to increase the vertical resolution, e.g. for a scanner adjusted to dpi resolution, i.e. a pixel in the original plane (0.00125 inch×0.00125 inch) is imaged in a pixel in the center plane (14 pm×14 pm) by just stepping half a scan line forward at a time, i.e. 24 and 48 steps between the R, G and B lines, corresponding to a basic resolution of 1600 dpi in a vertical direction. This will be the preferred method, since the larger number of scanned data provides a better result than using e.g. 800 dpi as a basic resolution and interpolating up to two times between each physical scan line pair.

I claim:

1. An optical scanner with variable line resolution, said scanner collecting information from an original along lines with predetermined mutual spacing comprising:

a calculating unit which, in response to a desired resolution, calculates locations of new lines with respect to scanned lines;

a line detector which successively registers optical information along the scanned lines, said line detector supplying a signal which represents the registered, optical information;

a converter to convert the registered, optical information signal into a digital signal;

a branch branching said digital signal along two branches;

a delay coupled to one of said two branches and adapted to delay the digital signal passing in the branch for a time period corresponding to a line length in said digital signal; and an interpolation means which receives the branched digital signal from said branches and forms as a desired line an interpolation signal between the branched digital signals in response to a desired line location with respect to a scanned line location.

2. The optical scanner of claim 1, wherein the calculating unit calculates a new interpolation value for each scanned line, the new interpolation value received by the interpolation means;

the new interpolation value calculated by adding a distance between the scanned lines to a previously calculated interpolation value; and if the new interpolation value is greater than the distance between the scanned lines, the distance is subtracted from the new interpolation value.

3. The optical scanner of claim 2 further comprising:

a RAM operably connected to the calculating unit, the RAM having stored therein correction data collected by a prescan of a reference; and wherein the calculating unit corrects the new interpolation value by a correction factor calculated in response to the correction data.

4. The optical scanner of claim 2 wherein the new interpolation value is converted to a digital value.

5. The optical scanner of claim 4 wherein the digital value further comprises a 4-bit digital value.

6. The optical scanner of claim 1 further comprising a CCD line array located in the line detector, the CCD line array having contents, and wherein the line detector supplies a video signal under control of a clock signal.

7. The optical scanner of claim 6, further comprising a CCD colour line array located in the line detector and the line detector generating the video signal including three colour signals under control of the clock signal.

8. The optical scanner of claim 7, further comprising:

a plurality of individual CCD colour line arrays located in the line detector, the plurality of individual CCD colour line arrays arranged in extension of each other and providing an output;

a multiplexer to receive the output of the CCD colour line arrays; and said video signal with three colour signals generated by successively writing contents of the individual CCD line arrays through the multiplexer.

9. The optical scanner of claim 6 further comprising:

a plurality of CCD line arrays located in the line detector, the CCD line arrays arranged in extension of each other and providing an output;

a multiplexer connected to the output of the CDD line arrays; and the video signal being generated by successively writing the output of the individual CDD line arrays the multiplexer.

10. The optical scanner of claim 1 wherein the branch further comprises a digital data bus.

11. The optical scanner of claim 1 wherein the delay comprises a buffer.

12. The optical scanner of claim 1 further comprising:

a micro controller providing an interpolation factor; and a PROM circuit which calculates the interpolation signal by means of two scanned lines and the interpolation factor received from the microcontroller.

13. The optical scanner of claim 12, wherein the interpolation means includes a means for calculating the interpolation signal using the algorithm:

$$D=(B(16-C+AC)/16.$$

wherein

D is a pixel in the desired line;

A is an associated pixel in a last-scanned line;

B is an associated pixel in an next-to-the-last-scanned line; and

C represents a distance between the desired line and a new scanned line.

14. The optical scanner of claim 1 further comprising:

a filter to receive the signal from the line detector and provide a filtered signal; and an analog-to-digital converter to receive the filtered signal and providing a digital signal to the branch.

15. An optical colour scanner with variable line resolution, said scanner collecting information from an original along lines with predetermined mutual spacing comprising:

a calculating unit which, in response to the desired resolution, calculates locations of new lines with a desired resolution with respect to scanned lines;

a line detector having a plurality of colour line sensors arranged substantially in parallel, said colour line sensors registering optical colour information along successive lines on an original by scanning, said line detector supplying a signal which represents the registered optical colour information;

a converter to convert the registered optical colour information signal into a digital signal;

a branch branching said digital signal along two branches;

a delay coupled to one of said two branches and adapted to delay the digital signal passing in the branch for a period of time corresponding to a line length of said digital signal; and an interpolation means which receives each digital signal from branches and forms as a desired line an interpolation signal between the digital signals in response to the location of the desired line with respect to a location of the scanned lines.

16. The optical colour scanner of claim 15 further comprising:

a new interpolation value for each scanned line calculated by the calculating unit, the new interpolation value received by the interpolation means;

the new interpolation value determined by adding a distance between the scanned lines to a previously calculated interpolation value; and if the new interpolation value is greater than the distance between the scanned lines, the distance is subtracted from the new interpolation value.

17. The optical colour scanner of claim 16 wherein the new interpolation value is converted to a digital value.

18. The optical scanner of claim 17 wherein the digital value further comprises a 4-bit digital value.

19. The optical scanner of claim 16, further comprising:

a RAM operably connected to the calculating unit;

correction data collected by a prescan of a reference and stored in the RAM; and the calculating trait corrects the new interpolation value by a correction factor calculated in response to the correction data.

20. The optical colour scanner of claim 15, further comprising a CCD line array located in the line detector, the CCD line array having contents, and the line detector supplies a video signal under control of a clock signal.

21. The optical colour scanner of claim 20, further comprising:
a plurality of individual CCD line arrays located in the line detector, the CCD line arrays arranged in extension of each other and providing an output;
a multiplexer connected to the output of the CCD line arrays; and
the video signal being generated by successively writing the output of the individual CCD line arrays through the multiplexer.

22. The optical colour scanner of claim 20, further comprising a CCD colour line array located in the line detector and the line detector generating a video signal including three colour signals under control of a clock signal.

23. The optical colour scanner of claim 22, further comprising:
a plurality of individual CCD colour line arrays located in the line detector, the plurality of individual CCD colour line arrays arranged in extension of each other and providing an output;
a multiplexer to receive the output of the CCD colour line arrays; and
said video signal with the three colour signals generated by successively writing the contents of the individual CCD line arrays through the multiplexer.

24. The optical colour scanner of claim 15, further comprising:
a number of line sensors located in the line detector, each line sensor registers colour in respective spectral bands;
a line converting unit containing the branch and delay;
a number of line converting units to receive the registered optical colour information signal of the line detector, and the number of line converting units corresponds to the number of line sensors.

25. The optical colour scanner of claim 24 further comprising digital data busses located on the branch of the line converting unit, and the delay includes buffer registers.

26. The optical colour scanner of claim 25 further comprising a static RAM included in the buffer registers addressed by a counter which counts a number of pixels in a line.

27. The optical colour scanner of claim 26 further comprising a count-down counter including a number corresponding to the number of pixels in a line prior to each line start.

28. The optical scanner of claim 26 further comprising a buffer store included in one or more of the line convening units, the buffer store to delay data for a period of time corresponding to a time difference produced when the line sensors of the line detector simultaneously read optical colour information from various lines on the original.

29. The optical colour scanner of claim 28 wherein the buffer register is formed by a dynamic RAM.

* * * * *

UNITED STATES PATENT AND TRADEMARK OFFICE
CERTIFICATE OF CORRECTION

PATENT NO. : 5,642,207
DATED : June 24, 1997
INVENTOR(S) : Asbjorn Smitt

It is certified that error appears in the above-indentified patent and that said Letters Patent is hereby corrected as shown below:

On the Title Page

In column 1, item [54], line 1, change "COLOR" to --COLOUR--.

In column 2, under "Attorney, Agent", change "Gustavo Siller; Meredith L. Martin" to --Brinks Hofer Gilson & Lione--.

In the Claims

In claim 9, line 8, after "arrays" insert --through--.

Signed and Sealed this

Twenty-ninth Day of May, 2001

Attest:

NICHOLAS P. GODICI

Attesting Officer

Acting Director of the United States Patent and Trademark Office